United States Patent
Chiba et al.

(10) Patent No.: US 10,583,737 B2
(45) Date of Patent: Mar. 10, 2020

(54) TARGET DETERMINATION APPARATUS AND DRIVING ASSISTANCE SYSTEM

(71) Applicants: TOYOTA JIDOSHA KABUSHIKI KAISHA, Toyota-shi, Aichi-ken (JP); DENSO CORPORATION, Kariya, Aichi-pref (JP)

(72) Inventors: Takashi Chiba, Gotenba (JP); Mitsutoshi Morinaga, Kariya (JP)

(73) Assignees: TOYOTA JIDOSHA KABUSHIKI KAISHA, Toyota-shi, Aichi-ken (JP); DENSO CORPORATION, Kariya, Aichi-ken (JP)

( * ) Notice: Subject to any disclaimer, the term of this patent is extended or adjusted under 35 U.S.C. 154(b) by 94 days.

(21) Appl. No.: 15/996,933

(22) Filed: Jun. 4, 2018

(65) Prior Publication Data

US 2018/0361854 A1   Dec. 20, 2018

(30) Foreign Application Priority Data

Jun. 14, 2017 (JP) .................. 2017-116907

(51) Int. Cl.
| | |
|---|---|
| *B60K 31/00* | (2006.01) |
| *B60W 30/09* | (2012.01) |
| *B60W 30/095* | (2012.01) |
| *G08G 1/16* | (2006.01) |
| *G01S 13/52* | (2006.01) |
| *G01S 13/86* | (2006.01) |
| *G01S 17/93* | (2020.01) |

(Continued)

(52) U.S. Cl.
CPC ......... *B60K 31/0008* (2013.01); *B60W 30/09* (2013.01); *B60W 30/0956* (2013.01); *G01S 7/415* (2013.01); *G01S 13/52* (2013.01); *G01S 13/865* (2013.01); *G01S 13/931* (2013.01); *G01S 17/50* (2013.01); *G01S 17/58* (2013.01); *G01S 17/936* (2013.01); *G08G 1/163* (2013.01); *B60K 2031/0025* (2013.01); *G01S 2013/9353* (2013.01); *G01S 2013/9375* (2013.01); *G08G 1/166* (2013.01); *G08G 1/167* (2013.01)

(58) Field of Classification Search
CPC combination set(s) only.
See application file for complete search history.

(56) References Cited

U.S. PATENT DOCUMENTS

| | | | |
|---|---|---|---|
| 2003/0011509 A1 | 1/2003 | Honda | |
| 2011/0221628 A1* | 9/2011 | Kamo | ............... G01S 7/295 342/70 |
| 2017/0043771 A1* | 2/2017 | Ibanez-Guzman | ............... B60W 30/0956 |

FOREIGN PATENT DOCUMENTS

| | | | |
|---|---|---|---|
| JP | 2002-189075 A | 7/2002 | |
| JP | 2002-303671 A | 10/2002 | |

* cited by examiner

*Primary Examiner* — Abby Y Lin
*Assistant Examiner* — Renee LaRose
(74) *Attorney, Agent, or Firm* — Sughrue Mion, PLLC (57) ABSTRACT

A target determination apparatus mounted in a vehicle includes a first relative speed acquisition device configured to acquire a relative speed of a target forward of the vehicle with respect to the vehicle as a first relative speed using a millimeter-wave radar, a second relative speed acquisition device configured to acquire a relative speed of the target with respect to the vehicle as a second relative speed using a lidar, and a determination device configured to, in a case where the difference between the first relative speed and the second relative speed exceeds a threshold, determine the target as an upper structure located above the height of the vehicle.

2 Claims, 6 Drawing Sheets (51) Int. Cl.
*G01S 13/931* (2020.01)
*G01S 17/50* (2006.01)
*G01S 7/41* (2006.01)
*G01S 17/58* (2006.01)
*G01S 13/93* (2020.01)

TARGET DETERMINATION APPARATUS AND DRIVING ASSISTANCE SYSTEM

INCORPORATION BY REFERENCE

The disclosure of Japanese Patent Application No. 2017-116907 filed on Jun. 14, 2017 including the specification, drawings and abstract is incorporated herein by reference in its entirety.

BACKGROUND

1. Technical Field

The present disclosure relates to a target determination apparatus and a driving assistance system that are mounted in a vehicle.

2. Description of Related Art

A driving assistance system that is mounted in a vehicle performs driving assistance control for assisting driving of the vehicle. As the driving assistance control described above, following cruise control or collision avoidance control is known.

The following cruise control is control for following a preceding vehicle while maintaining a set inter-vehicle distance. In a case where the inter-vehicle distance from the preceding vehicle falls below the set value, the driving assistance system automatically operates a braking device and reduces the speed of the vehicle.

The collision avoidance control is control for avoiding a collision with an obstacle (another vehicle, a bicycle, a pedestrian, or the like) on a path. In a case where determination is made that there is a possibility of a collision with an obstacle, the driving assistance system automatically operates the braking device and reduces the speed of the vehicle.

In both of the following cruise control and the collision avoidance control, there is a need to recognize an obstacle or a preceding vehicle forward of the vehicle as an "object" using an in-vehicle sensor. However, the in-vehicle sensor detects not only an obstacle or a preceding vehicle on a road surface, but also an "upper structure", such as a traffic sign, a signboard, or an over bridge provided above the road surface. In a case the upper structure described above is erroneously determined as an obstacle or a preceding vehicle, unneeded reduction in speed may occur. The occurrence of unneeded reduction in speed (erroneous reduction in speed) causes a driver to feel a sense of discomfort or uneasiness, and causes degradation of reliability to the driving assistance system.

Accordingly, it is desirable to accurately recognize an upper structure when the driving assistance control is performed.

Japanese Unexamined Patent Application Publication No. 2002-189075 (JP 2002-189075 A) discloses an on-road stationary object detection method. The method determines whether or not a target is an on-road stationary object using a camera and a radar device. In more detail, in a case where a target taken by the camera is identical to a target taken by the radar and determination is made that the height of the target is higher than a horizontal line from an image taken by the camera, determination is made that the target is an on-road stationary object.

Japanese Unexamined Patent Application Publication No. 2002-303671 (JP 2002-303671 A) discloses an object classification determination device capable of determining the classification of an object forward of a vehicle. The object classification determination device detects an object forward of a vehicle using a camera and a scanning laser radar. In a case where a signboard is provided above a forward lane, and in a case where the vehicle moves forward and approaches the signboard within a given distance, the signboard falls outside a detection range of the scanning laser radar. With the use of the above-described tendency, the object classification determination device determines that an object forward of the vehicle is a signboard provided above the lane.

SUMMARY

As described above, determination about whether or not a target forward of a vehicle is an upper structure is demanded in the driving assistance control or the like. However, in the cases of JP 2002-189075 A and JP 2002-303671 A, in a case where the vehicle does not approach a target within a predetermined distance, determination cannot be made whether or not the target is an upper structure.

Specifically, in the case of JP 2002-189075 A, a target is identified by analyzing an image captured by the camera. However, in order to accurately identify a target through image analysis, a relatively clear image is needed. That is, in a case where the camera is used, an identifiable range is relatively narrow, and it is not possible to identify a target unless the vehicle approaches the target within a predetermined distance. In the case of JP 2002-303671 A, determination that the target is an upper structure is made after the target approaches so much to fall outside the detection range of the scanning laser radar. Delay of determination that the target is an upper structure is not desirable from the viewpoint of the occurrence of unneeded reduction in speed, or the like.

The disclosure provides a technique capable of early determining whether or not a target forward of a vehicle is an upper structure.

A first aspect of the disclosure relates to a target determination apparatus mounted in a vehicle. The target determination apparatus includes a first relative speed acquisition device configured to acquire a relative speed of a target forward of the vehicle with respect to the vehicle as a first relative speed using a millimeter-wave radar, a second relative speed acquisition device configured to acquire a relative speed of the target with respect to the vehicle as a second relative speed using a lidar, and a determination device configured to, in a case where the difference between the first relative speed and the second relative speed exceeds a threshold, determine the target as an upper structure located above the height of the vehicle.

A second aspect of the disclosure relates to a driving assistance system mounted in a vehicle. The driving assistance system includes a target determination apparatus including a first relative speed acquisition device configured to acquire a relative speed of a target forward of the vehicle with respect to the vehicle as a first relative speed using a millimeter-wave radar, a second relative speed acquisition device configured to acquire a relative speed of the target with respect to the vehicle as a second relative speed using a lidar, and a determination device configured to, in a case where the difference between the first relative speed and the second relative speed exceeds a threshold, determine the target as an upper structure located above the height of the vehicle, and a driving assistance control device configured to perform driving assistance control. The driving assistance control includes at least one of collision avoidance control for avoiding a collision with an object forward of the vehicle and following cruise control for following the object while maintaining a set inter-vehicle distance. The driving assistance control device excludes the upper structure from the object in the driving assistance control.

According to the first aspect of the disclosure, the target determination apparatus acquires the relative speed of the same target (the same forward target) forward of the vehicle using the two types of sensors of the millimeter-wave radar and the lidar. The relative speed in a case where the millimeter-wave radar is used is the first relative speed, and the relative speed in a case where the lidar is used is the second relative speed. In a case where the target (forward target) forward of the vehicle is an upper structure, the difference between the first relative speed and the second relative speed increases as the vehicle approaches the upper structure. Accordingly, it is possible to determine whether or not the forward target is an upper structure by comparing the difference between the first relative speed and the second relative speed with the threshold.

According to the first aspect of the disclosure, determination is performed based on detection results of two types of sensors, instead of a detection result of one type of sensor. The determination method described above is hardly influenced by noise. That is, it is possible to determine whether or not the forward target is an upper structure with high accuracy.

According to the first aspect of the disclosure, unlike the case of JP 2002-189075 A, there is no need to use a camera in order to determine whether or not the forward target is an upper structure. The detection distances of the millimeter-wave radar and the lidar are sufficiently longer than an identifiable distance in a case where a camera is used. Since the millimeter-wave radar and the lidar having a relatively long detection distance are used, it is possible to early determine whether or not the forward target is an upper structure from a far distance.

According to the first aspect of the disclosure, determination is performed while the millimeter-wave radar and the lidar are detecting the forward target. Accordingly, determination in a stage much earlier than in the case of JP 2002-303671 A becomes possible.

As described above, the target determination apparatus according to the first aspect of the disclosure can early determine whether or not the forward target is an upper structure with high accuracy. Early determination is particularly effective in a case where the speed of the vehicle is relatively high.

The driving assistance system according to the second aspect of the disclosure uses the determination result of the target determination apparatus according to the first aspect of the disclosure. In more detail, in a case where the target determination apparatus determines that the forward target is an upper structure, the driving assistance control device excludes the forward target (upper structure) from the object in the driving assistance control.

As described above, the target determination apparatus according to the first aspect of the disclosure can early determine that the forward target is an upper structure. The earlier the timing when determination is made that the forward target is an upper structure, the less a probability that unneeded reduction in speed occurs. That is, according to the second aspect of the disclosure, the occurrence of unneeded reduction in speed (erroneous reduction in speed) is further suppressed. Since the occurrence of unneeded reduction in speed is further suppressed, a sense of discomfort and uneasiness of a driver is further reduced. In addition, reliability to the driving assistance system is further improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described referring to the accompanying drawings.

1. Outline

Figure 1:
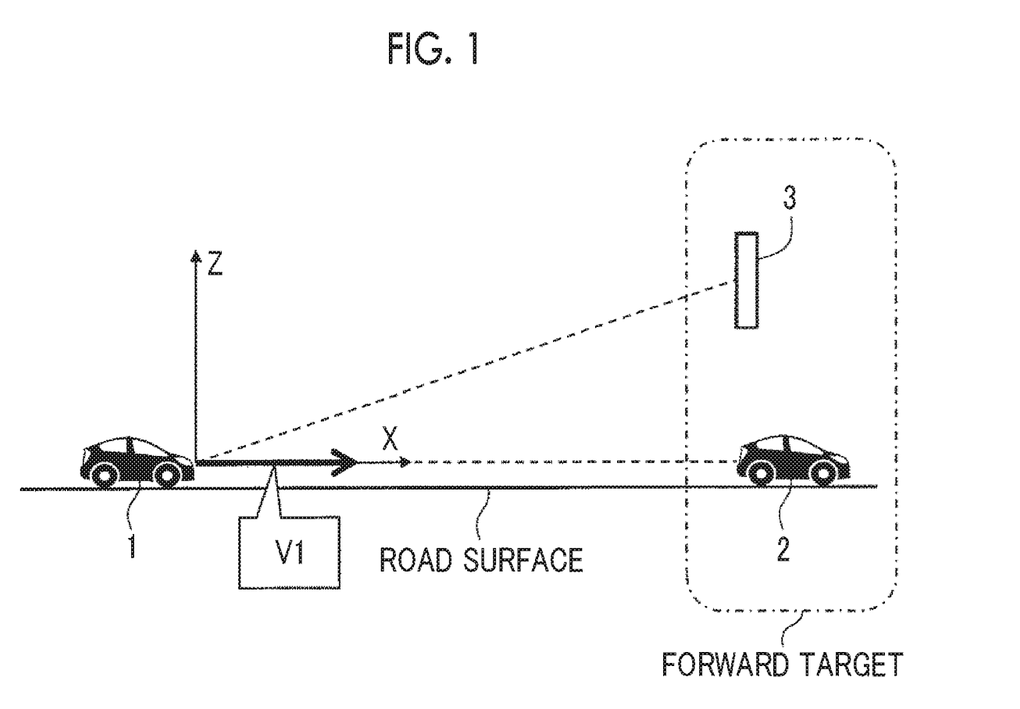
FIG. 1 is a schematic view showing an example of a vehicle and a forward target according to an embodiment of the disclosure.

FIG. 1 is a schematic view showing an example of a vehicle 1 and a forward target according to the embodiment. The vehicle 1 is traveling on a road surface at a given speed V1 in an X direction. That is, the X direction represents a moving direction of the vehicle 1. A Z direction represents an upper direction, that is, a direction away from a road surface. The X direction and the Z direction are orthogonal to each other. In the embodiment, solely a plane defined by the X direction and the Z direction is considered, and a horizontal direction is not considered.

There is the forward target forward of the vehicle 1. In FIG. 1, as the forward target, a stationary vehicle 2 and an upper structure 3 are illustrated. The stationary vehicle 2 is stopped on the road surface forward of the vehicle 1, and is located at the same height as the vehicle 1. The upper structure 3 is located diagonally forward of the vehicle 1, that is, above the height of the vehicle 1. As the upper structure 3, a traffic sign, a signboard, an over bridge, or the like provided above the road surface is illustrated.

As described below, the embodiment suggests a technique capable of determining whether or not the forward target is the upper structure 3. In order to perform the determination, a "relative speed" of the forward target with respect to the vehicle 1 is used. The relative speed of the forward target can be defined in a vehicle coordinate system fixed to the vehicle 1.

Figure 2:
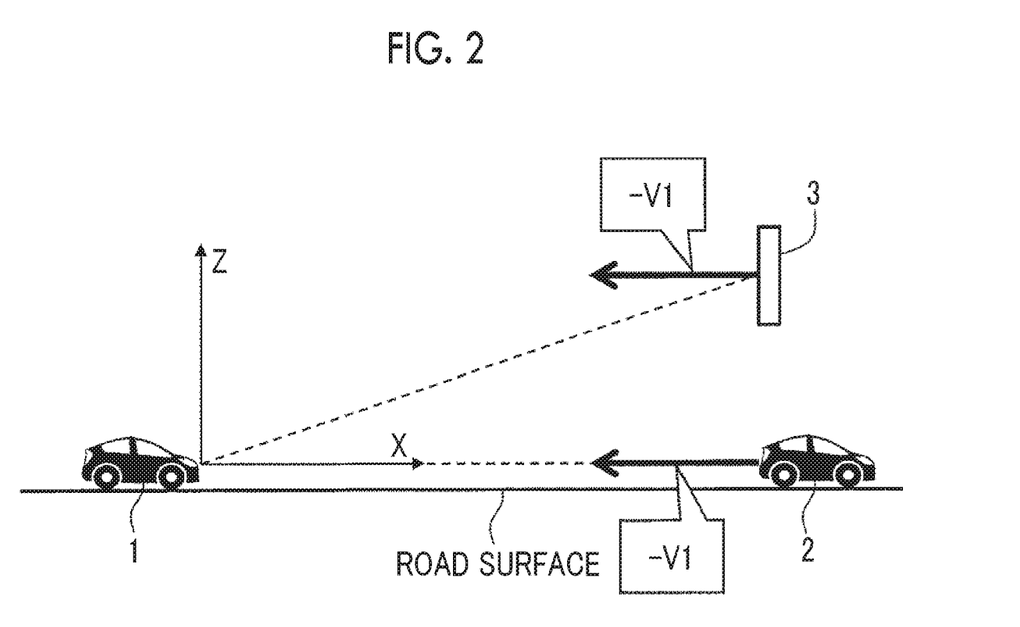
FIG. 2 is a conceptual diagram illustrating a relative speed of the forward target with respect to the vehicle.

FIG. 2 is a conceptual diagram illustrating the relative speed of the forward target in the vehicle coordinate system. In the vehicle coordinate system fixed to the vehicle 1, the vehicle 1 is stationary. Both of the stationary vehicle 2 and the upper structure 3 are moving in the X direction at a speed of "−V1". −V1 is the relative speed of each of the stationary vehicle 2 and the upper structure 3.

The relative speed of the forward target is measured or calculated by using a sensor mounted in the vehicle 1. In the embodiment, in order to acquire the relative speed of the forward target, two types of sensors of a millimeter-wave radar and a laser imaging detection and ranging (LIDAR) are used. Hereinafter, acquisition of a relative speed in each case of the millimeter-wave radar and the lidar will be described.

Figure 3:
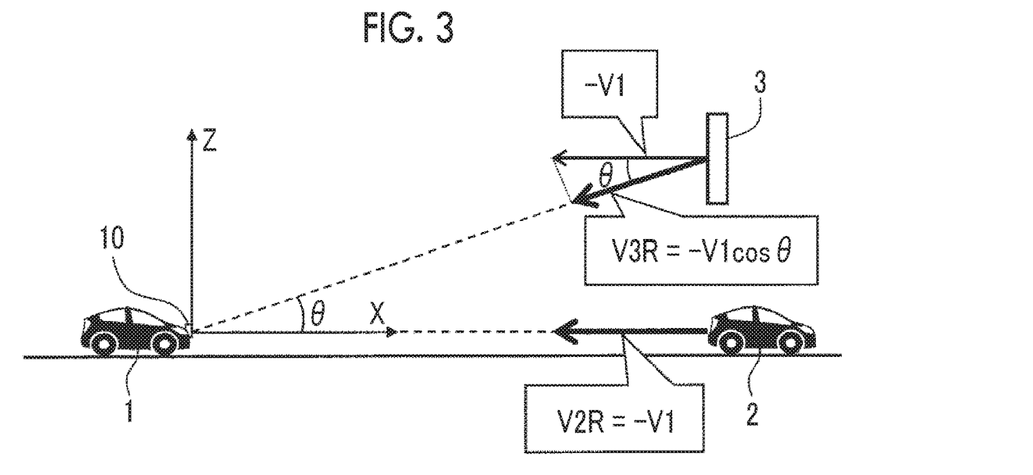
FIG. 3 is a conceptual diagram illustrating a relative speed of the forward target measured by a millimeter-wave radar.

FIG. 3 shows a case where a millimeter-wave radar 10 mounted in the vehicle 1 is used as a sensor. In a case where the millimeter-wave radar 10 is used, the relative speed of the forward target with respect to the vehicle 1 can be directly measured, in addition to the distance between the vehicle 1 and the forward target. However, the measured relative speed is a component in a sight direction (a direction along a line connecting the millimeter-wave radar 10 and the forward target). That is, relative speeds V2R, V3R of the stationary vehicle 2 and the upper structure 3 measured using the millimeter-wave radar 10 are represented by Expression (1).

$$V2R = -V1$$

$$V3R = -V1 \cdot \cos\theta \qquad \text{Expression (1):}$$

Here, the angle θ is the angle between a direction from the millimeter-wave radar 10 toward the upper structure 3 and the X direction, that is, an elevation angle of the upper structure 3 when viewed from the millimeter-wave radar 10. In regard to the upper structure 3 located diagonally upward, the measured relative speed V3R becomes a sight direction component (=−V1·cosθ) of the real relative speed (=−V1). The angle θ increases as the vehicle 1 approaches the upper structure 3. Accordingly, the relative speed V3R of the upper structure 3 varies depending on the distance between the vehicle 1 and the upper structure 3.

Figure 4:
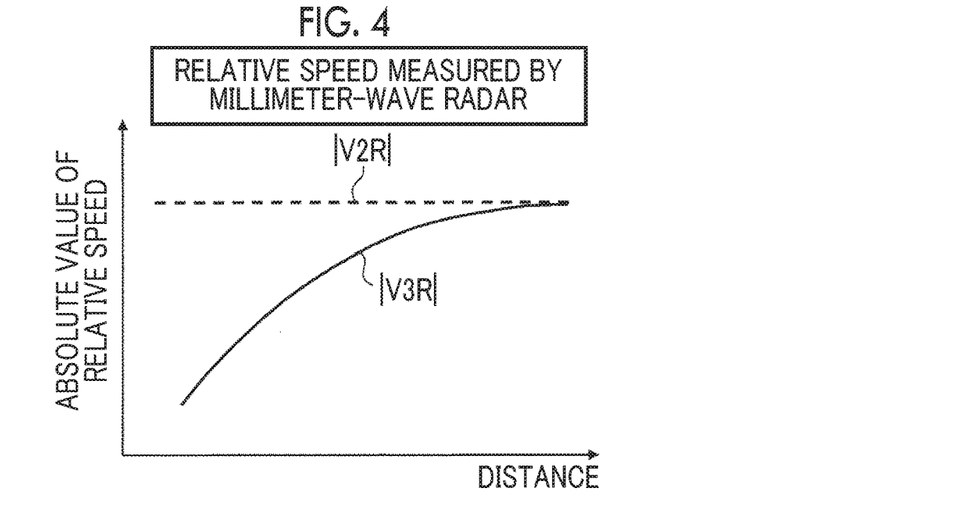
FIG. 4 is a graph showing characteristics of the relative speed of the forward target measured by the millimeter-wave radar.

FIG. 4 is a graph showing characteristics of the relative speeds V2R, V3R measured by the millimeter-wave radar 10. The horizontal axis represents the distance between the vehicle 1 and each forward target. The vertical axis represents an absolute value of each relative speed. As will be understood from Expression (1) and FIG. 4, the absolute value of the relative speed V2R of the stationary vehicle 2 is constant without depending on the distance between the vehicle 1 and each forward target. The absolute value of the relative speed V3R of the upper structure 3 varies depending on the distance between the vehicle 1 and each forward target. In more detail, the absolute value of the relative speed V3R of the upper structure 3 decreases as the distance between the vehicle 1 and each forward target decreases.

As described above, in a case where the millimeter-wave radar 10 is used, it is possible to directly measure the relative speed of the forward target; however, the characteristics of the measured relative speed change depending on whether or not the forward target is the upper structure 3.

Figure 5:
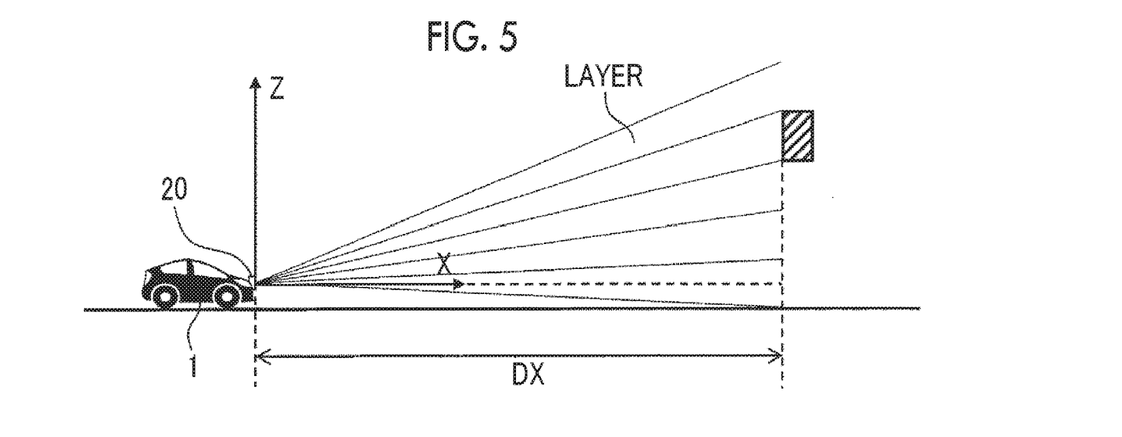
FIG. 5 is a conceptual diagram illustrating measurement by a lidar.

A case where the lidar 20 mounted in the vehicle 1 is used as a sensor will be described referring to FIGS. 5 to 7. The lidar 20 is superior in space resolution to the millimeter-wave radar 10, but cannot directly measure the relative speed of the forward target. A value directly measured by the lidar 20 is the distance to the forward target. However, as shown in FIG. 5, a measurement range of the lidar 20 in an up-down direction includes a plurality of layers, and a layer where the forward target is detected is understood. Accordingly, the horizontal distance Dx between the vehicle 1 and the forward target can be calculated from the distance to the forward target and information regarding the layer where the forward target is detected. The relative speed of the forward target can be calculated indirectly from a time derivative (time variation) of the horizontal distance Dx.

Figure 6:
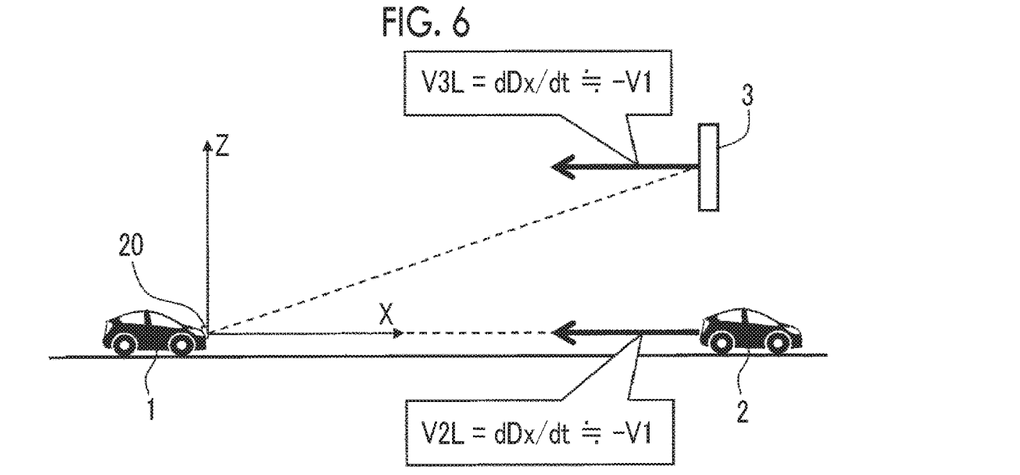
FIG. 6 is a conceptual diagram illustrating a relative speed of the forward target acquired using the lidar.

FIG. 6 shows the relative speed of the forward target acquired using the lidar 20. In a case where the lidar 20 is used, the relative speed of the forward target can be calculated from the time derivative of the horizontal distance Dx to the forward target. The calculated relative speeds V2L, V3L of the stationary vehicle 2 and the upper structure 3 are represented by Expression (2).

$$V2L = dDx/dt \approx -V1$$

$$V3L = dDx/dt \approx -V1 \qquad \text{Expression (2):}$$

As will be understood from FIG. 6 and Expression (2), with the use of the horizontal distance Dx, the real relative speed −V1 can be calculated as the relative speeds V2L, V3L. Unlike the case of the millimeter-wave radar 10, the relative speed V3L of the upper structure 3 does not depend on the angle θ.

Figure 7:
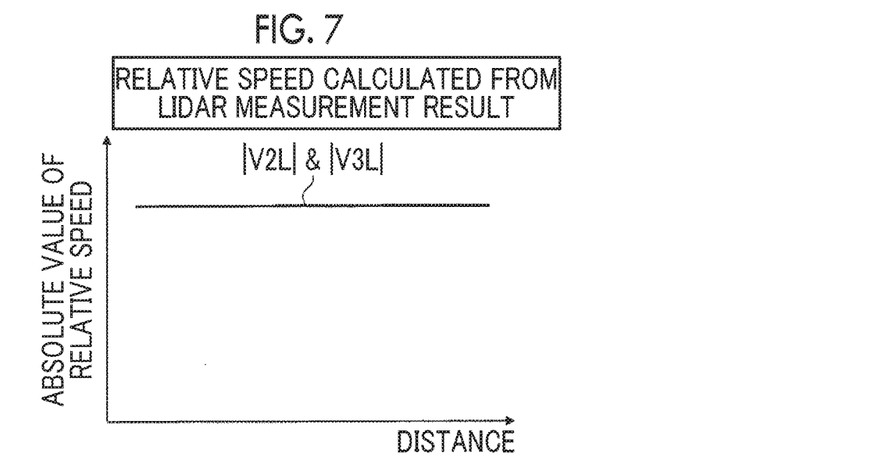
FIG. 7 is a graph showing characteristics of the relative speed of the forward target acquired using the lidar.

FIG. 7 is a graph showing the characteristics of the relative speeds V2L, V3L measured by the lidar 20. The horizontal axis represents the distance between the vehicle 1 and each forward target. The vertical axis represents an absolute value of each relative speed. As will be understood from Expression (2) and FIG. 6, both of the absolute value of the relative speed V2L and the absolute value of the relative speed V3L are constant without depending on the distance between the vehicle 1 and each forward target.

Figure 8:
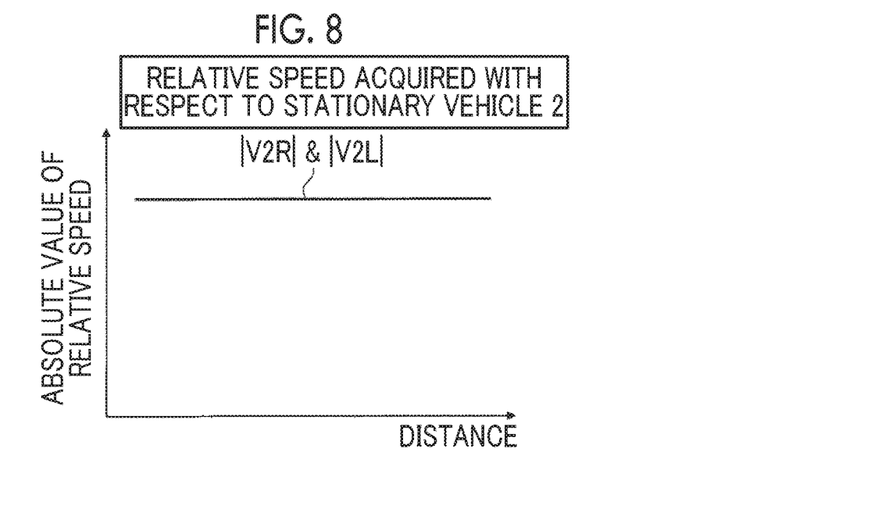
FIG. 8 is a graph showing characteristics of a relative speed acquired using each of the millimeter-wave radar and the lidar with respect to a stationary vehicle.

FIG. 8 is a graph showing the characteristics of the relative speeds V2R, V2L acquired using the millimeter-wave radar 10 and the lidar 20 in regard to the stationary vehicle 2. The horizontal axis represents the distance between the vehicle 1 and the stationary vehicle 2. The vertical axis represents an absolute value of each relative speed. As described above, both of the relative speeds V2R, V2L coincide with each other without depending on the distance between the vehicle 1 and each forward target. That is, when the same stationary vehicle 2 is detected using the two types of sensors of the millimeter-wave radar 10 and the lidar 20, the obtained relative speeds V2R, V2L coincide with each other.

Figure 9:
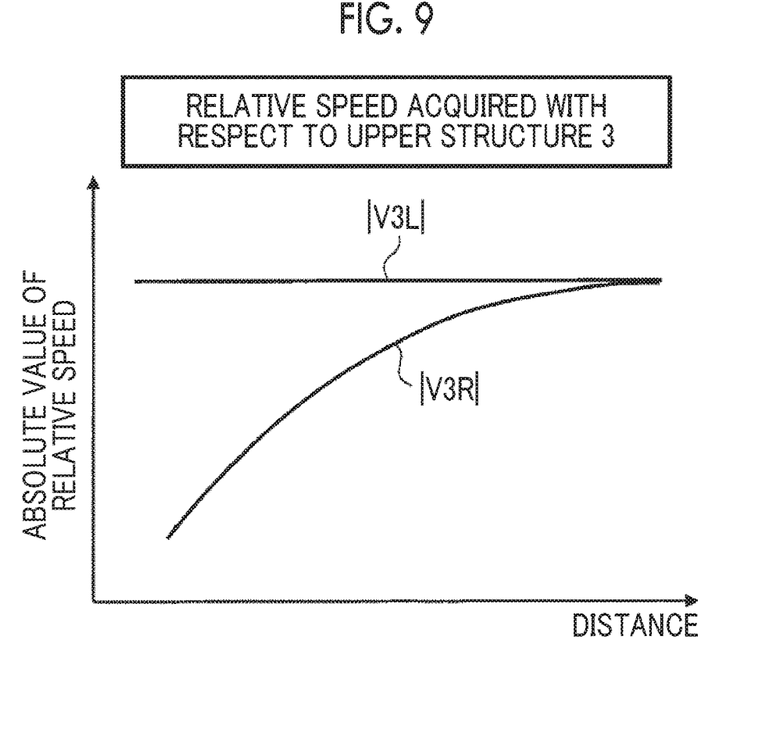
FIG. 9 is a graph showing characteristics of a relative speed acquired using each of the millimeter-wave radar and the lidar with respect to an upper structure.

FIG. 9 is a graph showing the characteristics of the relative speeds V3R, V3L acquired using the millimeter-wave radar 10 and the lidar 20 in regard to the upper structure 3. The horizontal axis represents the distance between the vehicle 1 and the upper structure 3. The vertical axis represents an absolute value of each relative speed. As described above, the relative speed V3L does not depend on the distance between the vehicle 1 and the upper structure 3. The relative speed V3R depends on the distance between the vehicle 1 and the upper structure 3, and decreases as the distance between the vehicle 1 and the upper structure 3 decreases. That is, when the same upper structure 3 is detected using the two types of sensors of the millimeter-wave radar 10 and the lidar 20, the obtained relative speeds V3R, V3L are different from each other. In particular, the difference between the relative speed V3R and the relative speed V3L depends on the distance between the vehicle 1 and the upper structure 3, and increases as the vehicle 1 approaches the upper structure 3.

As will be understood from FIGS. 8 and 9, when the relative speed of the forward target is acquired using the two types of sensors of the millimeter-wave radar 10 and the lidar 20, the characteristics of the relative speed change depending on whether or not the forward target is the upper structure 3. Accordingly, determination about whether or not the forward target is the upper structure 3 can be performed based on the acquisition result of the relative speed using the two types of sensors of the millimeter-wave radar 10 and the lidar 20.

Target determination according to the embodiment is based on the above-described principle. Hereinafter, a configuration for realizing target determination according to the embodiment will be described.

2. Target Determination Apparatus 2-1. Configuration

Figure 10:
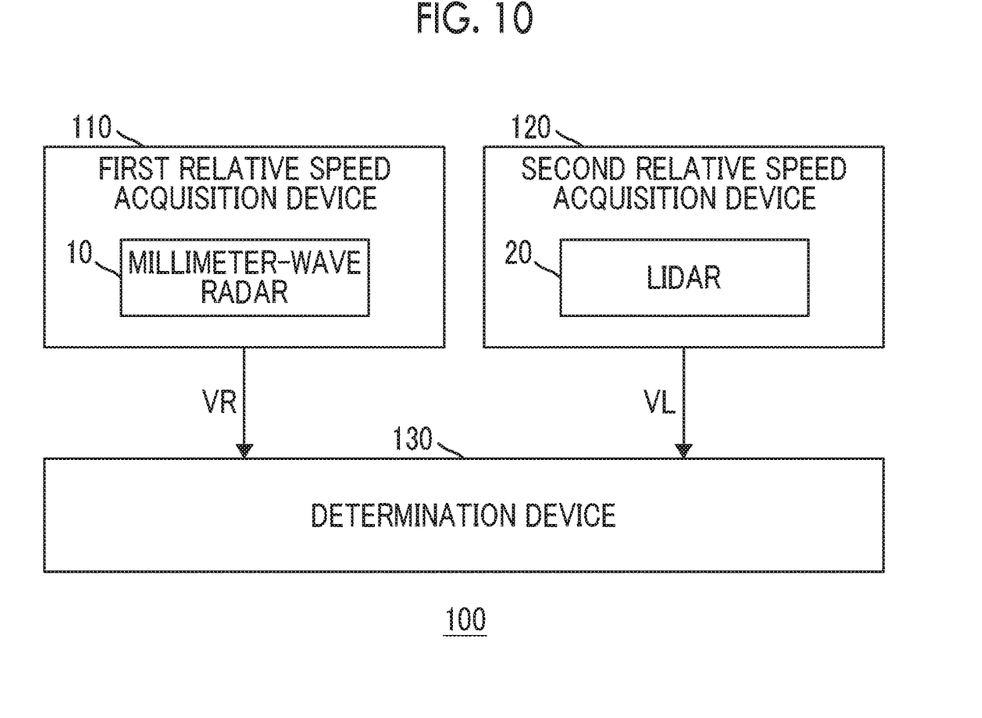
FIG. 10 is a block diagram showing the configuration of a target determination apparatus according to the embodiment of the disclosure.

FIG. 10 is a block diagram showing the configuration of a target determination apparatus 100 according to the embodiment. The target determination apparatus 100 is mounted in the vehicle 1, and determines whether or not the forward target forward of the vehicle 1 is the upper structure 3. In detail, the target determination apparatus 100 includes a first relative speed acquisition device 110, a second relative speed acquisition device 120, and a determination device 130.

The first relative speed acquisition device 110 includes the millimeter-wave radar 10 and various processing circuits (not shown). The first relative speed acquisition device 110 acquires a relative distance and a relative speed of the forward target with respect to the vehicle 1 using the millimeter-wave radar 10 (see FIG. 3). The relative speed acquired using the millimeter-wave radar 10 is hereinafter referred to as a "first relative speed VR". The characteristics of the first relative speed VR are as shown in FIG. 4. The first relative speed acquisition device 110 sends information regarding the acquired relative distance and first relative speed VR to the determination device 130.

The second relative speed acquisition device 120 includes the lidar 20 and various processing circuits (not shown). The second relative speed acquisition device 120 acquires a relative distance and a relative speed of the forward target with respect to the vehicle 1 using the lidar 20 (see FIGS. 5 and 6). The relative speed acquired using the lidar 20 is hereinafter referred to as a "second relative speed VL". The characteristics of the second relative speed VL are as shown in FIG. 7. The second relative speed acquisition device 120 sends information regarding the acquired relative distance and second relative speed VL to the determination device 130.

The determination device 130 is realized by an electronic control unit (ECU). The ECU is a microcomputer including a processor, a storage device, and an input/output interface. The processor executes a program stored in the storage device, whereby the functions of the determination device 130 are realized.

The determination device 130 first confirms whether or not the same forward target is detected by the millimeter-wave radar 10 and the lidar 20. For example, in a case where the difference between the relative distances obtained by the millimeter-wave radar 10 and the lidar 20 is equal to or less than a predetermined distance threshold, and the difference between the first relative speed VR and the second relative speed VL is equal to or less than a predetermined speed threshold, determination is made that the same forward target is detected. Even though the forward target is the upper structure 3, in a stage where the vehicle 1 is sufficiently away from the upper structure 3, there is almost no difference between the first relative speed VR and the second relative speed VL (see FIG. 9).

The determination device 130 calculates the difference $\Delta V$ $(=|VR-VL|)$ between the first relative speed VR and the second relative speed VL acquired for the same forward target. The determination device 130 monitors how the difference $\Delta V$ changes along with moving of the vehicle 1. In a case where the forward target is the upper structure 3, as the vehicle 1 approaches the forward target, the difference $\Delta V$ should be increased (see FIG. 9). From the viewpoint described above, the determination device 130 compares the difference $\Delta V$ between the first relative speed VR and the second relative speed VL with a predetermined threshold $\Delta Vth$. In a case where the difference $\Delta V$ exceeds the threshold $\Delta Vth$, the determination device 130 determines the forward target as the upper structure 3.

2-2. Flowchart

Figure 11:
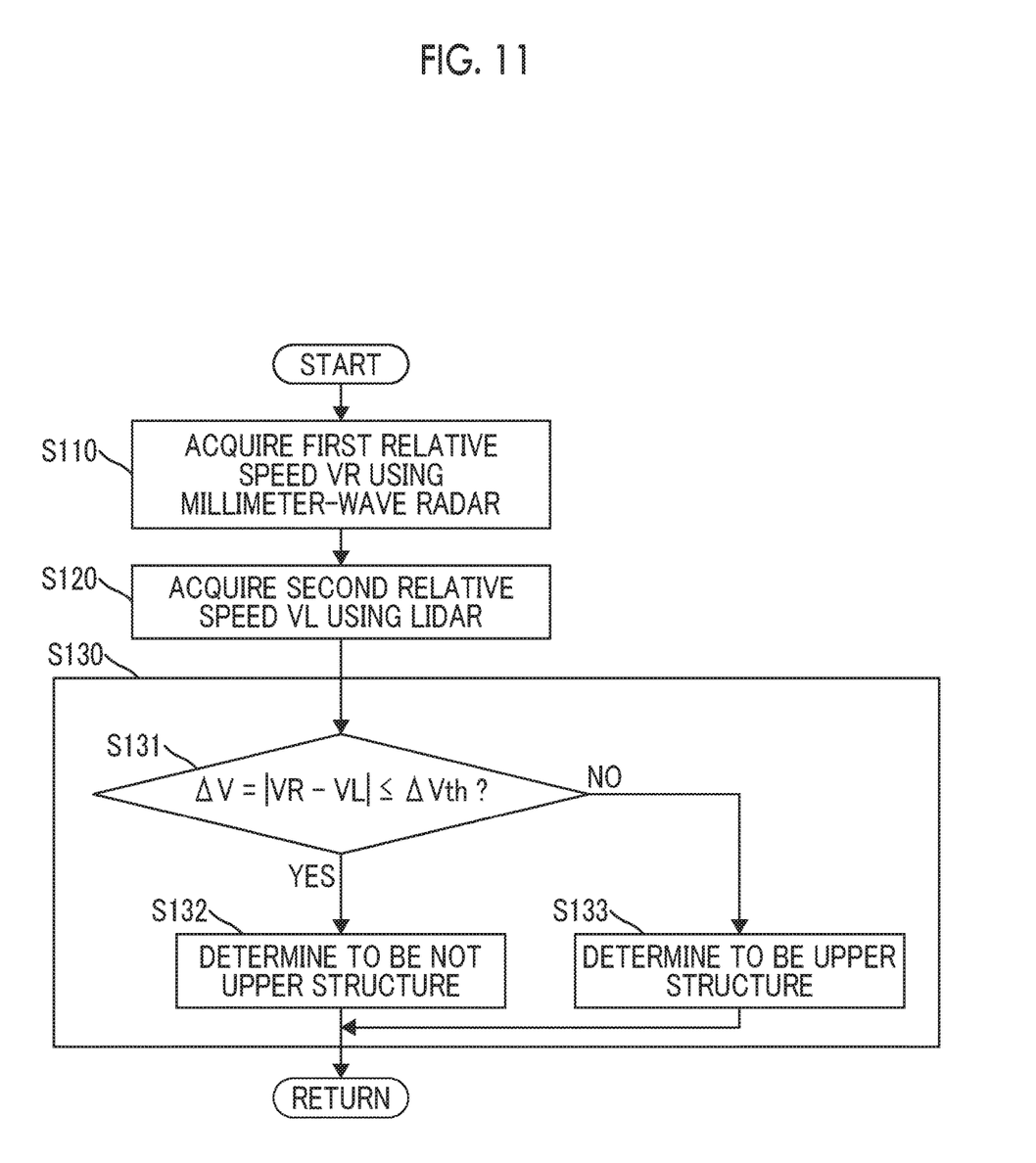
FIG. 11 is a flowchart showing a target determination method in the target determination apparatus according to the embodiment of the disclosure in summary.

FIG. 11 is a flowchart showing a target determination method in the target determination apparatus 100 according to the embodiment. A routine shown in FIG. 11 is repeatedly executed.

Step S110: The target determination apparatus 100 acquires the first relative speed VR as the relative speed of the forward target with respect to the vehicle 1 using the millimeter-wave radar 10.

Step S120: The target determination apparatus 100 acquires the second relative speed VL as the relative speed of the forward target with respect to the vehicle 1 using the lidar 20.

Step S130: The target determination apparatus 100 calculates the difference $\Delta V$ $(=|VR-VL|)$ between the first relative speed VR and the second relative speed VL, and compares the difference $\Delta V$ with the threshold $\Delta Vth$ (Step S131). In a case where the difference $\Delta V$ is equal to or less than the threshold $\Delta Vth$ (Step S131: Yes), the target determination apparatus 100 determines that the forward target is not the upper structure 3 (Step S132). In a case where the difference $\Delta V$ exceeds the threshold $\Delta Vth$ (Step S131: No), the target determination apparatus 100 determines that the forward target is the upper structure 3 (Step S133).

2-3. Effects

As described above, the target determination apparatus 100 according to the embodiment acquires the relative speed of the same forward target using the two types of sensors of the millimeter-wave radar 10 and the lidar 20. The relative speed in a case where the millimeter-wave radar 10 is used is the first relative speed VR, and the relative speed in a case where the lidar 20 is used is the second relative speed VL. In a case where the forward target is the upper structure 3, the difference $\Delta V$ between the first relative speed VR and the second relative speed VL increases as the vehicle 1 approaches the upper structure 3. Accordingly, determination can be made whether or not the forward target is the upper structure 3 by comparison of the difference $\Delta V$ with the threshold $\Delta Vth$.

According to the embodiment, determination is performed based on the difference between the detection results of the two types of sensors, instead of the detection result of one type of sensor. The determination method described above is hardly influenced by noise. That is, it is possible to determine whether or not the forward target is the upper structure 3 with high accuracy.

According to the embodiment, it is possible to early determine whether or not the forward target is the upper structure 3. The above will be described while comparing with the cases of JP 2002-189075 A and JP 2002-303671 A.

First, as a first comparative example, the technique disclosed in JP 2002-189075 A is considered. In the case of JP 2002-189075 A, a forward target is identified by analyzing an image captured by the camera. However, in order to accurately identify a forward target through image analysis, a relatively clear image is needed. That is, in a case where the camera is used, an identifiable range is relatively narrow, and it is not possible to identify a forward target unless the vehicle approaches the forward target with a predetermined distance.

According to the embodiment, there is no need to use a camera in order to determine whether or not the forward target is the upper structure 3. Both of the detection distances of the millimeter-wave radar 10 and the lidar 20 are equal to or longer than 100 m, and are sufficiently longer than an identifiable distance in a case where a camera is used. Since the millimeter-wave radar 10 and the lidar 20 having a relatively long detection distance are used, it is possible to early determine whether or not the forward target is the upper structure 3 from a far distance.

As a second comparative example, the technique disclosed in JP 2002-303671 A is considered. In the case of JP 2002-303671 A, determination that a forward target is a signboard is made after the forward target approaches so much to fall outside a detection range of the scanning laser radar. In the embodiment, determination is performed while the millimeter-wave radar 10 and the lidar 20 are detecting a forward target. Accordingly, determination in a stage much earlier than the case of the second comparative example becomes possible.

As described above, the target determination apparatus 100 according to the embodiment can early determine whether or not the forward target is the upper structure 3 with high accuracy. Early determination is particularly effective in a case where the speed of the vehicle 1 is relatively high.

3. Driving Assistance System

The above-described target determination apparatus 100 is typically applied to a driving assistance system that assists driving of the vehicle 1. Hereinafter, a driving assistance system using the target determination apparatus 100 according to the embodiment will be described.

Figure 12:
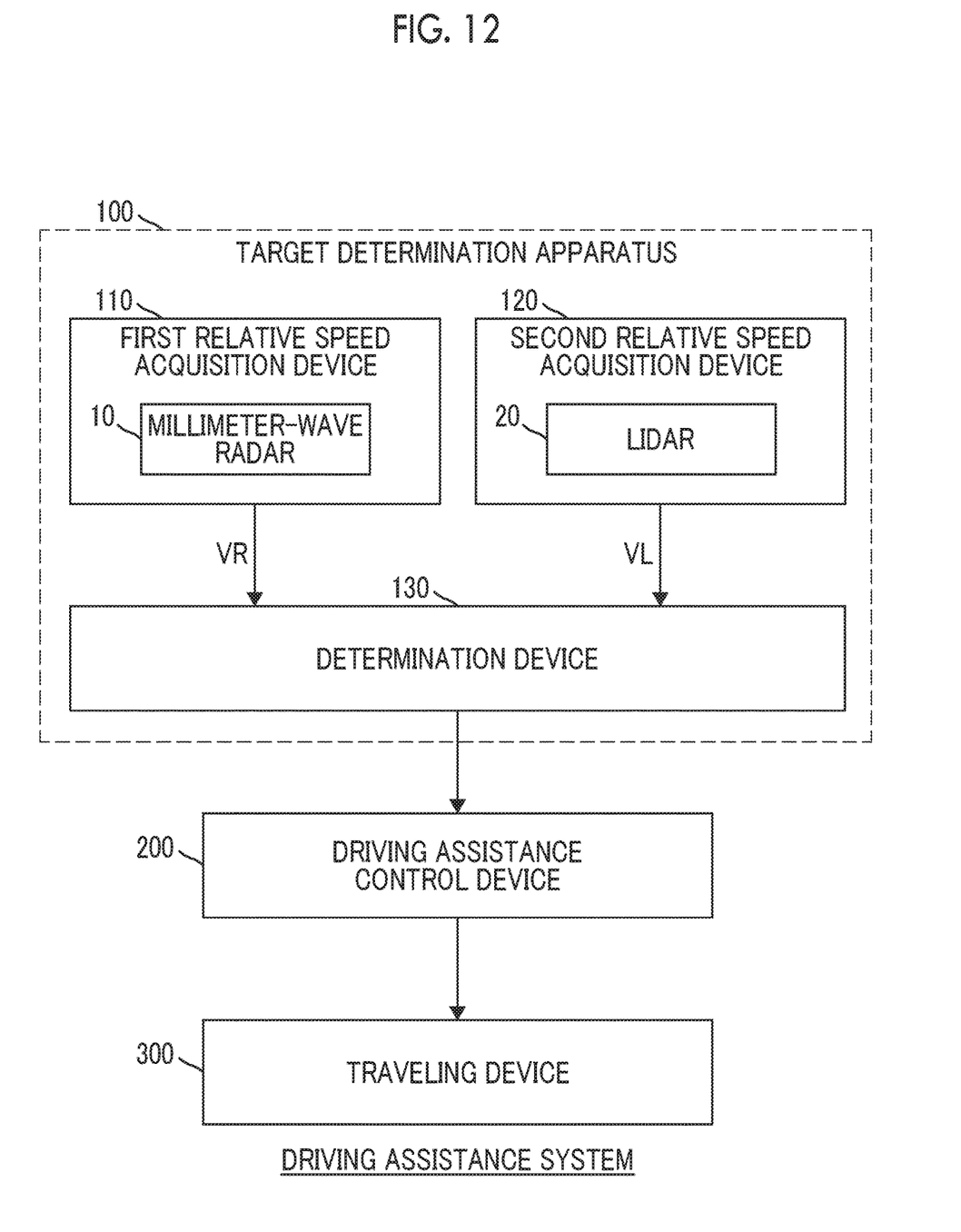
FIG. 12 is a block diagram showing the configuration of a driving assistance system using the target determination apparatus according to the embodiment of the disclosure.

FIG. 12 is a block diagram showing the configuration of a driving assistance system using the target determination apparatus 100 according to the embodiment. The driving assistance system is mounted in the vehicle 1, and includes the target determination apparatus 100, a driving assistance control device 200, and a traveling device 300. The traveling device 300 includes a drive device that drives the vehicle 1, a braking device that applies a brake, and a steering device that performs steering of the vehicle 1.

The driving assistance control device 200 performs driving assistance control for assisting driving of the vehicle 1. The driving assistance control device 200 is realized by an ECU. As the driving assistance control, at least one of following cruise control and collision avoidance control is carried out.

The following cruise control is control for following a preceding vehicle while maintaining a set inter-vehicle distance, and is also referred to as adaptive cruise control (ACC). In a case where the inter-vehicle distance from the preceding vehicle falls below the set value, the driving assistance control device 200 automatically operates the braking device of the traveling device 300 and reduces the speed of the vehicle 1.

The collision avoidance control is control for avoiding a collision with an obstacle (another vehicle, a bicycle, a pedestrian, or the like) on a path, and is also referred to as pre-crash safety system (PCS). In a case where determination is made that there is a possibility of a collision with an obstacle, the driving assistance control device 200 automatically operates the braking device of the traveling device 300 and reduces the speed of the vehicle 1.

In both cases of the following cruise control and the collision avoidance control, there is a need to recognize an obstacle forward of the vehicle or a preceding vehicle as an "object" using an in-vehicle sensor. However, the in-vehicle sensor detects not only an obstacle or a preceding vehicle on a road surface, but also the upper structure 3 located above the road surface. In a case where the upper structure 3 described above is erroneously determined as an obstacle or a preceding vehicle, unneeded reduction in speed may occur. The occurrence of unneeded reduction speed causes a driver to feel a sense of discomfort or uneasiness, and causes degradation of reliability to the driving assistance system. Accordingly, it is desirable to accurately recognize the upper structure 3 when the driving assistance control is performed.

The driving assistance control device 200 according to the embodiment uses the determination result of the above-described target determination apparatus 100. In more detail, in a case where the target determination apparatus 100 determines that the forward target is the upper structure 3, the driving assistance control device 200 excludes the forward target (upper structure 3) from an object in the driving assistance control.

As described above, the target determination apparatus 100 according to the embodiment can early determine that the forward target is the upper structure 3. The earlier the timing when determination is made that the forward target is the upper structure 3, the less a probability that unneeded reduction in speed occurs. That is, according to the embodiment, the occurrence of unneeded reduction in speed (erroneous reduction in speed) is further suppressed. Since the occurrence of unneeded reduction in speed is further suppressed, a sense of discomfort and uneasiness of the driver is further reduced. In addition, reliability to the driving assistance system is further improved.

What is claimed is:

1. A target determination apparatus mounted in a vehicle, the target determination apparatus comprising:
   a first relative speed acquisition device configured to acquire a relative speed of a target forward of the vehicle with respect to the vehicle as a first relative speed using a millimeter-wave radar;
   a second relative speed acquisition device configured to acquire a relative speed of the target with respect to the vehicle as a second relative speed using a lidar; and
   a determination device configured to, in a case where a difference between the first relative speed and the second relative speed exceeds a threshold, determine the target as an upper structure located above a height of the vehicle.

2. A driving assistance system mounted in a vehicle, the driving assistance system comprising:
   a target determination apparatus including
      a first relative speed acquisition device configured to acquire a relative speed of a target forward of the vehicle with respect to the vehicle as a first relative speed using a millimeter-wave radar, a second relative speed acquisition device configured to acquire a relative speed of the target with respect to the vehicle as a second relative speed using a lidar, and a determination device configured to, in a case where a difference between the first relative speed and the second relative speed exceeds a threshold, determine the target as an upper structure located above a height of the vehicle; and a driving assistance control device configured to perform driving assistance control, wherein:

the driving assistance control includes at least one of collision avoidance control for avoiding a collision with an object forward of the vehicle and following cruise control for following the object while maintaining a set inter-vehicle distance; and the driving assistance control device excludes the upper structure from the object in the driving assistance control.

\* \* \* \* \*